(12) United States Patent
Kempf

(10) Patent No.: US 9,669,668 B2
(45) Date of Patent: Jun. 6, 2017

(54) WHEEL MODULE COMPRISING AN ELASTICALLY DEFORMABLE INFLATION VALVE FOR A TYRE PRESSURE MONITORING SYSTEM

(71) Applicants: CONTINENTAL AUTOMOTIVE FRANCE, Toulouse (FR); CONTINENTAL AUTOMOTIVE GmbH, Hannover (DE)

(72) Inventor: Christian Kempf, Toulouse (FR)

(73) Assignees: CONTINENTAL AUTOMOTIVE FRANCE, Toulouse (FR); CONTINENTAL AUTOMOTIVE GMBH, Hannover (DE)

( * ) Notice: Subject to any disclaimer, the term of this patent is extended or adjusted under 35 U.S.C. 154(b) by 0 days.

(21) Appl. No.: 14/408,029

(22) PCT Filed: Jul. 17, 2013

(86) PCT No.: PCT/EP2013/002115
§ 371 (c)(1),
(2) Date: Dec. 15, 2014

(87) PCT Pub. No.: WO2014/019645
PCT Pub. Date: Feb. 6, 2014

(65) Prior Publication Data
US 2015/0136244 A1 May 21, 2015

Related U.S. Application Data

(60) Provisional application No. 61/677,047, filed on Jul. 30, 2012.

(30) Foreign Application Priority Data

Dec. 21, 2012 (FR) ..................................... 12 62634

(51) Int. Cl.
*F16K 15/20* (2006.01)
*B60C 23/04* (2006.01)
*B60C 29/02* (2006.01)

(52) U.S. Cl.
CPC .......... *B60C 23/0494* (2013.01); *B60C 29/02* (2013.01); *B60C 23/0496* (2013.01);
(Continued)

(58) Field of Classification Search
CPC .................... Y10T 137/3584; Y10T 137/3662
(Continued)

(56) References Cited

U.S. PATENT DOCUMENTS 5,956,820 A * 9/1999 Albinski ................. B60C 23/04
24/455
6,952,957 B2 * 10/2005 Kayukawa .......... B60C 23/0494
73/146.8

(Continued)

FOREIGN PATENT DOCUMENTS

CN 101638040 2/2010
CN 102300722 12/2011
(Continued)

OTHER PUBLICATIONS

"Thread" Macmillan Dictionary. Dec. 2015.*
"Wire" Macmillan Dictionary. Dec. 2015.*
International Search Report, dated Sep. 3, 2013, from corresponding PCT application.

*Primary Examiner* — R. K. Arundale
(74) *Attorney, Agent, or Firm* — Young & Thompson

(57) ABSTRACT

A wheel module for a tire pressure monitoring system includes an inflation valve of the "snap-in" type and an electronic casing fixed thereto in a reversible manner. This valve is produced from a resiliently deformable material and includes a valve body and a metal conduit extending therethrough for introducing inflation air. The valve body has a first end provided with a thread for receiving a closure cap (Continued)

Figure 1:
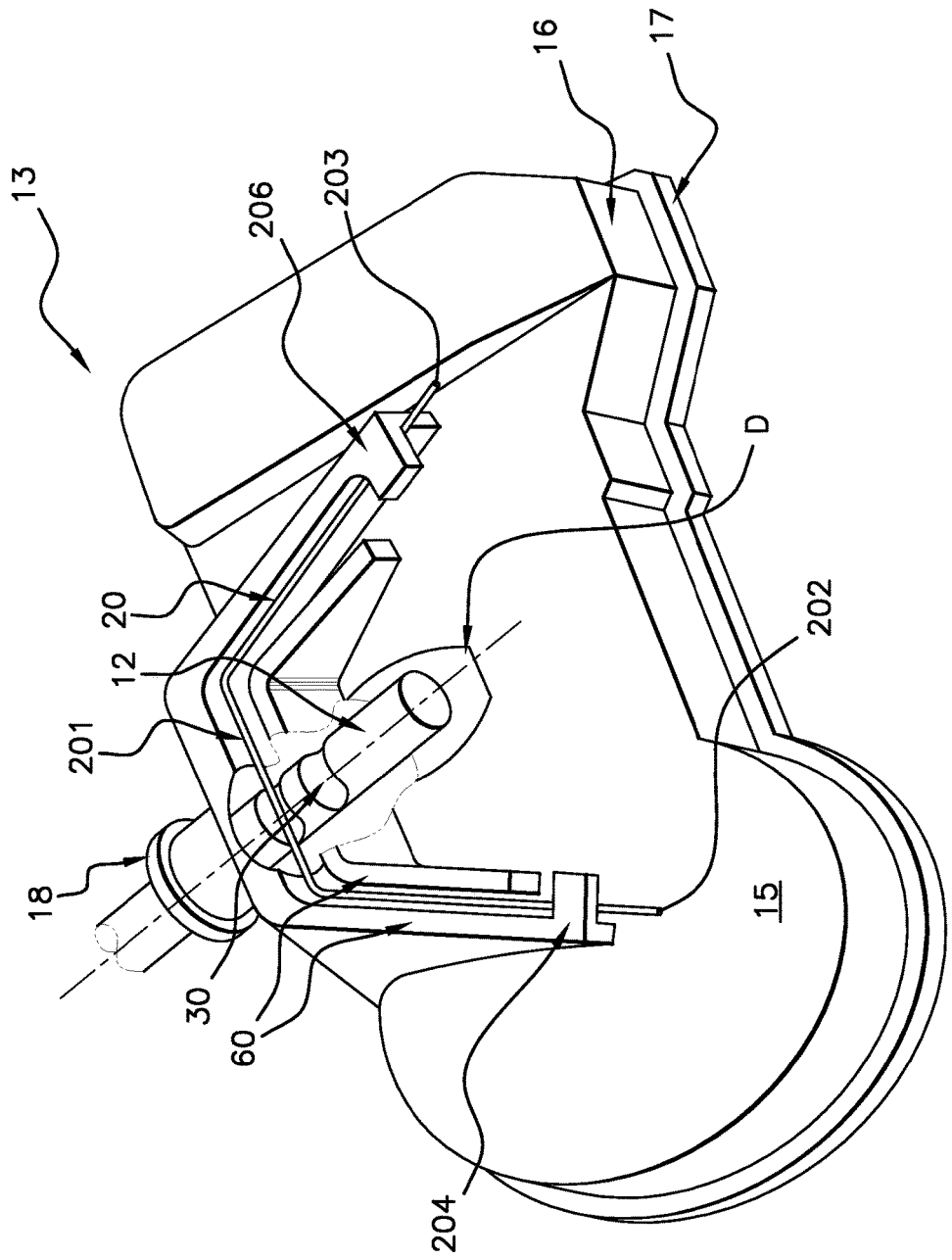

and a second end with a hollow metal fixing rod provided with notches fixed thereto. The electronic casing is slidingly mounted on the fixing rod and includes an element for blocking the position of the casing relative to the valve in a reversible manner. The blocking element includes a substantially U-shaped metal wire, a first end and a second end of which are inserted below retention lugs produced on the same face of the casing. This metal wire is insertable into the notches.

11 Claims, 3 Drawing Sheets

(52) U.S. Cl.
CPC .... *Y10T 29/49945* (2015.01); *Y10T 137/3584* (2015.04); *Y10T 137/3662* (2015.04)

(58) Field of Classification Search
USPC .......... 152/427, 428; 73/146.2, 146.3, 146.8
See application file for complete search history.

(56) References Cited

U.S. PATENT DOCUMENTS

| | | | |
|---|---|---|---|
| 2004/0206169 A1* | 10/2004 | Normann | B60C 23/0494 73/146.2 |
| 2007/0062268 A1 | 3/2007 | Blossfeld et al. | |
| 2009/0007649 A1 | 1/2009 | Kempf et al. | |
| 2010/0024539 A1 | 2/2010 | Hamm et al. | |
| 2010/0192682 A1 | 8/2010 | Gory et al. | |
| 2011/0248204 A1 | 10/2011 | Palaoro et al. | |
| 2012/0312389 A1 | 12/2012 | Kempf | |

FOREIGN PATENT DOCUMENTS

| | | |
|---|---|---|
| DE | 202009007703 U1 | 4/2010 |
| EP | 1433625 | 6/2004 |
| FR | 2918315 A1 | 1/2009 |
| FR | 2954733 A1 | 7/2011 |

\* cited by examiner

WHEEL MODULE COMPRISING AN ELASTICALLY DEFORMABLE INFLATION VALVE FOR A TYRE PRESSURE MONITORING SYSTEM

BACKGROUND OF THE INVENTION

The present invention relates to a wheel module which comprises a resiliently deformable inflation valve for a tire pressure monitoring system. More specifically, this wheel module is provided with a device for locking (or blocking in position) the position of an electronic casing on the valve.

Description of the Related Art

It is already known to provide motor vehicles with tire pressure monitoring systems. Such systems comprise:
- a wheel module which is constituted by an electronic casing which is positioned on an inflation valve of a vehicle wheel, and
- a central unit which is mounted on the frame of the vehicle.

The electronic casing is conventionally provided with pressure, temperature and acceleration sensors, etc., which are capable of measuring the value of these parameters inside the tire. The electronic casing also comprises a unit for processing and analyzing the signals measured by these sensors. The measurements carried out are sent to the central unit via a wireless connection (generally a radio frequency connection).

The central unit receives the signals transmitted by each of the electronic casings. It analyzes and processes the signals received in order to inform the driver of any anomaly. The central unit is further capable of determining the position on the vehicle of each of the electronic casings from which it receives the signals.

Such tire pressure monitoring systems are well-known and will not be discussed in detail here.

The electronic casings which are fixed to each wheel of the vehicle are generally assembled on the inflation valve of these wheels and are arranged inside the covering of the tire. They are thus capable of measuring, for example, the pressure inside the tire.

There are two large types of inflation valves for tires.

A first type is constituted by metal inflation valves.

A second type is constituted by inflation valves of deformable resilient material (for example, rubber). This second type of valve is further called a "snap-in" type valve. These valves have the specific feature of having a body of resiliently deformable material whose diameter is greater than the hole of the wheel rim into which they are introduced. The positioning of these inflation valves is produced by forced introduction into this wheel rim hole. This positioning is made possible by the fact that the deformable body of the valve is stretched from resilient material. The temporary narrowing of the valve body obtained in this manner by this stretching allows it to be introduced into the hole of the wheel rim. After they have been positioned in the hole of the wheel rim, these valves return to their initial shape and the resilient material from which they are formed closes the hole of the wheel rim in a sealed manner. An inner conduit with respect to the valve allows air to be introduced into the tire in order to inflate it to the pressure recommended by the motor vehicle manufacturer.

These inflation valves therefore have a head of deformable material located at the inner side of the tire.

When a tire pressure monitoring system uses such a valve, it is necessary to fix an electronic casing on this valve head. To this end, there are numerous fixing systems, such as, for example, the one described in the patent application FR 2 918 315 to which reference may be made for further information.

It is thus known to provide the inner conduit of the inflation valve with a metal rod which extends toward the inner side of the tire and to which an electronic casing is fixed. The fixing of the electronic casing to this rod is further locked by a blocking element. The assembly constituted by the inflation valve and the electronic casing is called a wheel module below.

When it is desirable to mount a tire on a wheel rim which is provided with a wheel module, specific precautions must be complied with. In particular, the introduction of the assembly/disassembly tool of the tire must be carried out at a minimum distance from the location of the wheel module.

It has now been found that, during the assembly/disassembly of the tire, for various reasons, the assembly/disassembly instructions are not strictly complied with. This is the case both on production lines of the motor vehicle manufacturer and at workshops which are called upon to assemble/disassemble a tire. Consequently, the free edge of the tire is brought into contact with the wheel module and more specifically the electronic casing for monitoring the pressure of the tires. When the free edge of the tire moves above the electronic casing, a considerable force, in the order of 1000 N, is applied to the casing. In the case of a wheel module constituted by an electronic casing and a valve of the "snap-in" type, a blocking element which ensures that the casing is held in position with respect to the inflation valve is also subjected to this pressing force of the free edge of the tire. This pressing force has a tendency to open the blocking element, which brings about the disengagement of the electronic casing and the valve. Of course, such a disengagement renders the tire pressure monitoring inoperative.

SUMMARY OF THE INVENTION

An object of the present invention is to overcome these disadvantages. In particular, it is desirable to ensure reinforced locking of the electronic casing on the valve head in order to allow assembly of the tire under any circumstances without disengagement of the electronic casing from the valve head.

To this end, the present invention relates to a wheel module for a tire pressure monitoring system, the module comprising a valve of the "snap-in" type and an electronic casing which is fixed to the valve in a reversible manner.

The valve is produced from a resiliently deformable material and comprises a valve body through which a metal conduit extends for the introduction of inflation air. This conduit has a first end which is provided with a thread which is capable of receiving a closure cap and a second end to which there is fixed a hollow metal fixing rod which is provided with notches.

The electronic casing is mounted in a sliding manner on the fixing rod and comprises a means for blocking the position of the casing relative to the valve in a reversible manner.

According to the invention, the module is characterized in that the blocking means is constituted by a substantially U-shaped metal wire, a first end and a second end of which are inserted below a retention lug which is produced on a face of the casing, the metal wire being capable of being inserted into the notches of the fixing rod in order to apply to the casing a stress force which is capable of fixing the casing in position relative to the valve.

In this manner, the means for blocking the electronic casing in position on the valve is constituted by a simple metal wire (having spring action) which has the specific feature of reinforcing the blocking of the casing on the valve when it is subjected to a stress force which is directed toward the casing. Consequently, when the free edge of the tire is passed on the casing, the pressing action of this free edge on this casing face and therefore on the metal wire brings about increased locking of the casing on the valve and not as before the disengagement of these two elements.

The invention has therefore involved, instead of preventing the passage of the free edge of the tire over the casing, ensuring that the passage brings about an increased locking action and not an unlocking action.

Advantageously, it is a central portion of the U-shaped metal wire which is inserted into the notches of the fixing rod. The insertion of this central portion of the metal wire under stress applies a maximum force to the casing.

The metal wire according to the invention further has a second end which can be moved between a position inserted below the retention lug and a free position in which the metal wire is not subjected to any stress and is disengaged from the fixing rod.

Advantageously, the electronic casing is provided with an inclined plane on the face which carries the metal wire in the region of the second end of the wire. This inclined plane is capable of facilitating the insertion of an unblocking tool below the second end of the wire. Dislodging the second end of the metal wire from the retention lug enables the disengagement of the casing and the fixing rod, which allows the casing to be removed in order to change it (for example) without having to remove the valve from the rim of the wheel. The connection between the casing and the valve head is thus reversible.

In a further advantageous manner, the metal wire used is a steel cable having a rupture strength in the order of 2000 MPa.

In a variant, the metal wire may be provided in the region of the fixed end thereof with an element which forms a spring which is capable of applying a stress force to the wire when it is inserted into the notches of the fixing rod. This element which forms a spring may, for example, be in the form of those used in known manner on "mouse traps".

BRIEF DESCRIPTION OF THE DRAWING FIGURES

Figure 2:
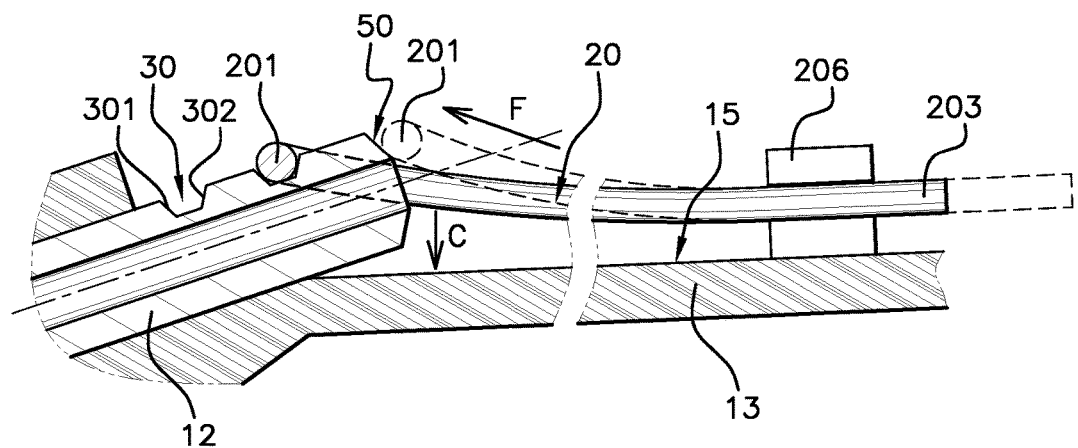
Figure 3:
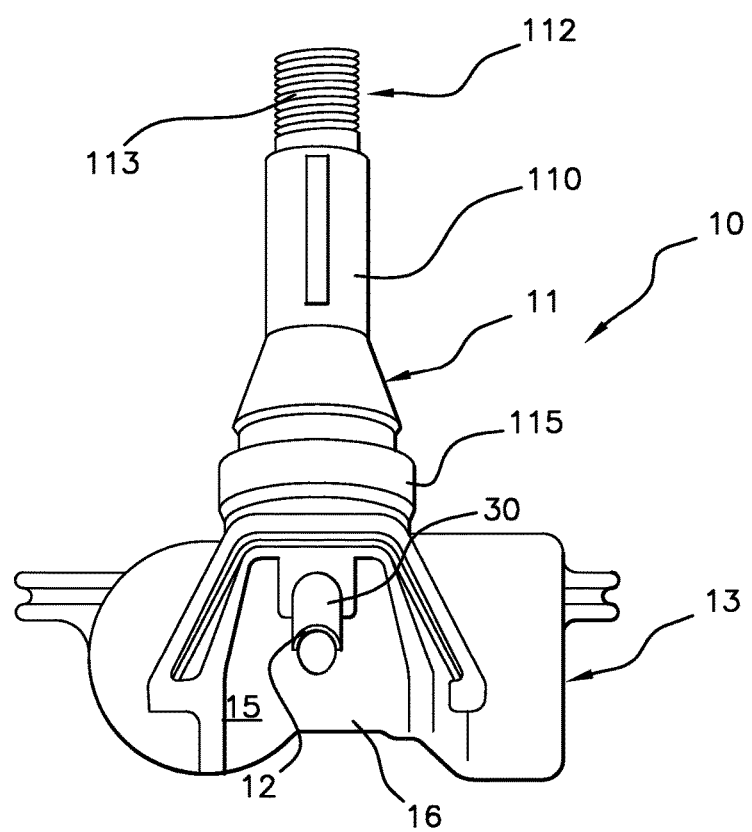
Figure 4:
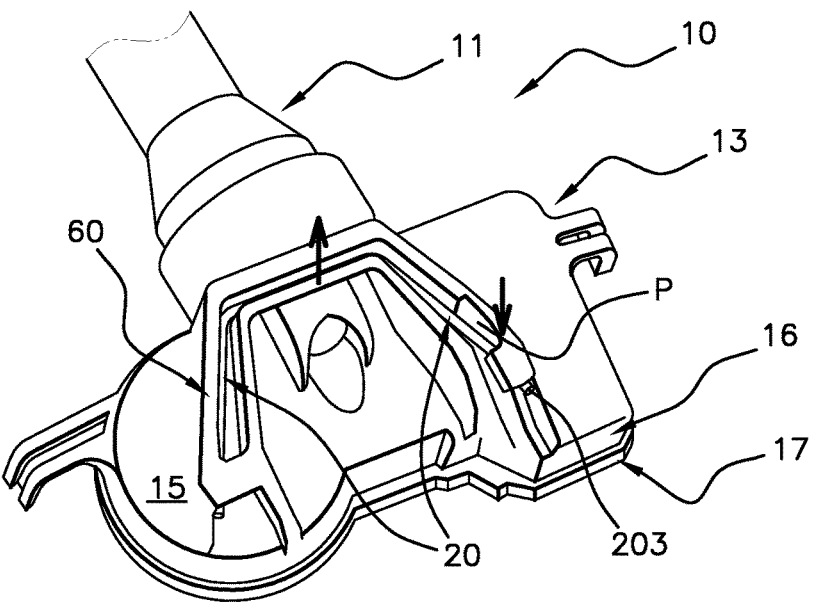
Figure 5:
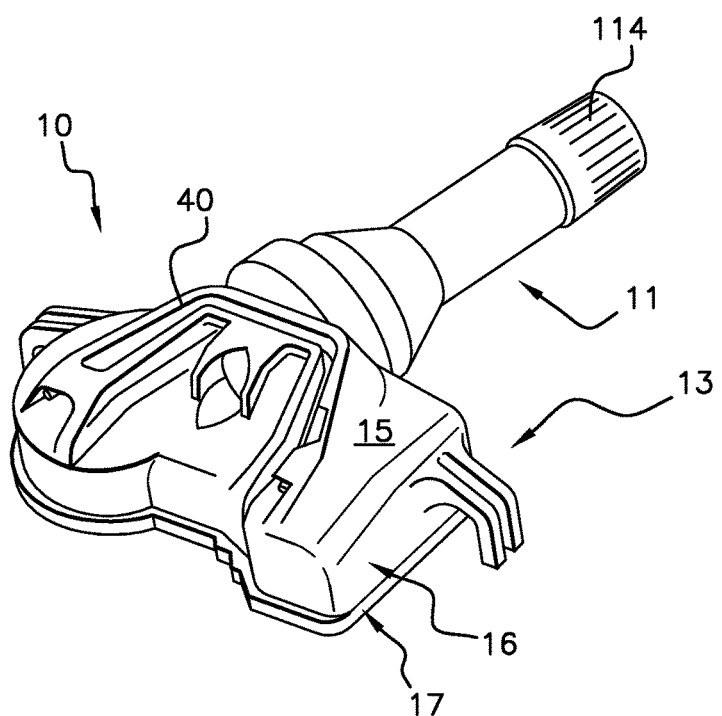
Figure 6:
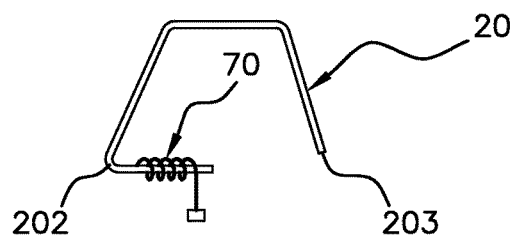

Other objectives, features and advantages of the present invention will be better understood from a reading of the following description, given by way of non-limiting example, with reference to the appended drawings, in which:

FIG. 1 is a schematic, perspective view of an electronic casing according to the present invention, FIG. 2 is a schematic sectioned view of the detail designated D in FIG. 1, FIG. 3 is a schematic plan view of a wheel module according to the invention, FIG. 4 is a schematic, perspective view of a wheel module according to the invention, illustrating more specifically the inclined unlocking plane P, FIG. 5 is a schematic, perspective view of a production variant of a wheel module according to the invention, and FIG. 6 is a schematic view of the first end of the metal wire according to the invention provided with an element which forms a spring.

DETAILED DESCRIPTION OF THE INVENTION

According to the embodiment illustrated in FIG. 3, a wheel module 10 according to the invention comprises:
a rubber inflation valve 11 of the "snap-in" type which is provided with a fixing rod 12,
an electronic casing 13, and
a means 20 (FIG. 1) for locking the electronic casing 13 in position on the valve 11.

The inflation valve 11 (FIG. 3) is produced from a resiliently deformable material (generally rubber). It comprises in known manner a generally cylindrical body 110 through which there extends longitudinally an air conduit which is produced from metal and in which the inflation air circulates. A first end 112 of the body is provided with a thread 113 which is capable of receiving a closure cap 114 (FIG. 5) of the air conduit. A second end 115 of the body of the valve 11 is provided with a fixing rod 12 (FIG. 1). This fixing rod 12 is produced from metal and is hollow so as to leave a passage for the inflation air.

The inflation valve 11 is intended to be placed in a hole which is provided in known manner on the wheel rim of a motor vehicle wheel. In known manner, when the valve body is inserted into the hole of the wheel rim, the material which constitutes the body of the inflation valve stretches to pass through the hole, then relaxes to block the inflation valve in this hole.

The electronic casing 13 (FIGS. 1, 4) is produced from resistant synthetic material. It is in the form of a box-like body 16 which is provided with a cover 17. The fixing of the cover and the casing body can be carried out using any appropriate means and will not be set out in detail here.

Inside the box-like body 16, there is in a manner known per se a printed circuit board which is provided with electronic components, a battery, an antenna (not illustrated). The electronic components located in the box-like body 16 also comprise (in a non-limiting manner) temperature, pressure and accelerations sensors (not illustrated).

The electronic casing 13 is provided on the upper face 15 thereof (face opposite the cover 17) with a guiding ring 18 (FIG. 1) which is capable of being mounted in a sliding manner around the fixing rod 12.

The casing is thus mounted so as to slide freely on the fixing rod 12 prior to the introduction of the inflation valve into the hole of the wheel rim. In this manner, when this inflation valve is positioned in the hole of the wheel rim, the casing does not impede the stretching of the resilient material which constitutes the inflation valve. This is because the casing remains in permanent contact with the inflation valve and slides on the fixing rod in order to allow the valve to be positioned.

When the inflation valve is positioned in the wheel rim hole, the casing is still in contact with the valve and must be fixed in this position. The invention relates to a means for blocking the casing in position relative to the valve when the valve is positioned in a hole of the wheel rim.

More specifically, this blocking means must be reversible, that is to say, it must be able to ensure that the casing is locked in position relative to the valve but also that it is unlocked, for example, in order to promote replacement operations for a used electronic casing.

To this end, the invention proposes a blocking means which is constituted by a metal wire 20. This metal wire is preferably produced from steel and has a rupture strength in the order of 2000 MPa.

As illustrated in FIG. 1, the metal wire 20 is substantially in the form of a U which is broken down into a central portion 201 and two ends 202, 203. The first end 202 is inserted below a first retention lug 204 which is located on the upper face 15 of the box-like body 16. The second end 203 of the metal wire 20 is itself inserted below a second retention lug 206. The retention lugs 204 and 206 are an integral component of the upper face 15 of the casing.

It should be noted that the metal wire 20 inserted in this manner at the first and second ends 202, 203 thereof below the retention lugs 204, 206 applies no stress force to the upper face 15 of the casing.

In order to block the position of the casing 13 relative to the valve 11, it is necessary to insert the central portion 201 of the metal wire into a notch 30 of the fixing rod 12. In order to block this central portion 201 in a notch 20 of the fixing rod 12, it is sufficient to place the first end 202 of the metal wire below the retention lug 204 and to position the metal wire 20 between guiding grooves 60 which are produced at the surface of the upper face 15 of the casing. The second end 203 is inserted below the retention lug 206 by means of lateral displacement (of the type used in conventional manner in order to close a "safety pin"). In doing so, the central portion 201 of the metal wire is automatically inserted into one of the notches 30 of the fixing rod 12. This central portion 201 is therefore raised by the fixing rod (as can clearly be seen in FIG. 2 where it will be noted that the metal wire is curved in an upward direction). This results in the creation of a stress force C which is directed toward the electronic casing, since the two ends of the wire 20 are further both held in a state blocked in a position relative to the upper face 15 of the casing.

It should further be noted that the notches 30 (FIG. 2) produced in the fixing rod 12 have an inclined edge 301 and a straight edge 302. The end of the fixing rod 12 closest to the casing 13 is further provided with a chamfer 50. The specific shape of the notches 30 and the chamfer 50 allow the central portion 201 of the metal wire to be readily introduced into a notch 30 of the fixing rod and to be held firmly in this position. This is because, as can be seen in FIG. 2, the wire 20 (illustrated with dotted lines) is placed on the upper face of the casing 13, in an initial position in which it is not inserted into the notches 30. By applying a force F to the casing 13, the central portion 201 of the wire 20 is pushed against the chamfer 50. The shape of this chamfer allows the central portion 201 of the wire 20 to be guided with a reduced effort toward the notches 30. As soon as the central portion of the metal wire is introduced into the first notch (on the right-hand side in FIG. 2), the straight edge 302 of this notch retains the wire in the notch and acts counter to the extraction thereof (via a direction force counter to the arrow F). If the casing is not completely in contact with the head of the valve 11 when the wire is in the first notch, the inclined edge 301 of this notch, in cooperation with the application of a force which is directed in accordance with the arrow F, enables the wire to be released from the first notch in order to be positioned in the second notch (further to the left in FIG. 2). Consequently, it is possible to find the ideal positioning of the wire 20 in one of the notches of the fixing rod 12 in order to ensure contact between the casing 13 and the valve head.

The assembly method for blocking the casing in position on the valve head involves applying to the casing 13 a force F which is directed toward the valve head 11. This force brings the central portion 201 of the blocking means into contact with the chamfer 50 and at least one of the notches 30 of the fixing rod 12 in order to block the casing in position on the valve 11 without any effort.

The metal wire according to the invention thus acts as a means for blocking the casing in position relative to the inflation valve.

Advantageously, when the tire is assembled or disassembled, when the free edge of the tire compresses the upper face 15 of the casing, it brings about an increase of the blocking force of the casing relative to the valve. The passage of this free edge can therefore no longer bring about the disengagement of the casing and the valve as before.

In a further advantageous manner, such a blocking means is simple to produce, inexpensive and extremely efficient.

According to the invention, this blocking means is further reversible. This is because it is possible to release the second end 203 of the metal wire 20 by disengaging it from below the retention lug 206. To this end, an inclined plane P is used (FIG. 4) which is provided close to this second end in order to slide an unlocking tool (for example, a simple screwdriver) thereon and to remove the second end 203 of the metal wire 20 from below the retention lug 206. The inclined plane P is thus adapted to facilitate the insertion of an unblocking tool below the second end of the wire in order to disengage it from the retention lug. Consequently, the tension in the metal wire is immediately released and the central portion 201 of this wire can be withdrawn from the notch 30 of the fixing rod 12 without effort. The casing 13 can then be disengaged from the inflation valve 11.

In this manner, the second end 203 of the metal wire 20 can be moved between a position inserted below the retention lug 206 and a free position in which the metal wire 20 is not subjected to any stress and is disengaged from the fixing rod 12.

In order to facilitate the movement (and the retention in position) of the metal wire 20 on the upper face 15 of the casing 13, the upper face thereof is provided with a channel 40 (at least a partial channel) into which the metal wire 20 is inserted (FIG. 5). This channel may be continuous over the entire path of the metal wire or be constituted by guiding ribs which are distributed in a discontinuous manner over the entire path of the wire.

In a variant (FIG. 6), the tension (stress) present in the metal wire (which is fixed at the two ends thereof and positioned in a notch of the fixing rod in the region of the central portion thereof) may be amplified or created by an element 70 which forms a spring which is fixedly connected to the first end 202 of the wire, at one side, and the upper face of the cover, at the other side. The production of an element which forms a spring is known per se. It is advantageously possible to mention by way of example the spring element which is fixedly joined to a metal rod such as the one used in a "mousetrap", for example.

Of course, the invention is not limited to the embodiment described. In this manner, the metal wire which forms the reversible blocking means may have different cross-sections (round, square, rectangular) and be produced from any material which has a suitable rupture strength force. In the same manner, it is possible to position the second end 203 of the wire 20 in a fixed manner and to position the first end 202 of this wire in a removable manner. That is to say, to reverse the functions of the first and second ends. In this instance, of course, the inclined plane P is produced on the rib located close to the first end 202.

The invention claimed is:

1. A wheel module for a tire pressure monitoring system, the module comprising an inflation valve (11) of the "snap-in" type and an electronic casing (13) which is fixed to the valve in a removable manner:
wherein the valve is produced from a resiliently deformable material and comprises a valve body (110) through which a metal conduit extends for the introduction of inflation air, the valve body has a first end (112) which is provided with a thread (113) which is capable of receiving a closure cap (114) and a second end (115) to which there is fixed a hollow metal fixing rod (12) which is provided with notches (30),
the electronic casing (13) is mounted in a sliding manner on the fixing rod (12) and comprises a means for blocking the position of the casing relative to the valve in a reversible manner,
the module being characterized in that the blocking means is constituted by a substantially U-shaped metal wire (20), a first end (202) and a second end (203) of which are inserted below retention lugs (204, 206) which are produced on a face (15) of the casing, the metal wire (20) being capable of being inserted into the notches (30) of the fixing rod (12) in order to apply to the casing a stress force (C) which is capable of fixing the casing in position relative to the valve.

2. The wheel module as claimed in claim 1, characterized in that it is a central portion (201) of the metal wire (20) which is inserted into the notches (30) of the fixing rod (12).

3. The wheel module as claimed in claim 1, characterized in that the second end (203) of the metal wire (20) can be moved between a position inserted below the retention lug (206) and a free position in which the metal wire (20) is not subjected to any stress and is disengaged from the fixing rod.

4. The wheel module as claimed in claim 3, characterized in that the electronic casing (13) is provided with an inclined plane (P) on the face which carries the metal wire in the region of the second end (203) of the wire, the inclined plane (P) being capable of facilitating the insertion of an unblocking tool below the second end of the wire in order to disengage it from the retention lug (206).

5. The wheel module as claimed in claim 1, characterized in that the metal wire (20) is produced from a steel which has a rupture strength in the order of 2000 MPa.

6. The wheel module as claimed in claim 1, characterized in that the metal wire (20) is at least partially integrated in a channel (40) which is produced on the face (15) of the casing which carries the metal wire (20).

7. The wheel module as claimed in claim 1, characterized in that the first end (202) of the wire is associated with an element which forms a spring (70).

8. The wheel module as claimed in claim 1, characterized in that the fixing rod (12) is provided with notches (30) which have an inclined edge (301) and a straight edge (302), the rod being provided with a chamfer (50) at the end thereof closest to the casing (13).

9. The wheel module as claimed in claim 2, characterized in that the second end (203) of the metal wire (20) can be moved between a position inserted below the retention lug (206) and a free position in which the metal wire (20) is not subjected to any stress and is disengaged from the fixing rod.

10. A method for assembling an element (20) for blocking a wheel module in position as claimed in claim 8, characterized in that the blocking in position of the blocking means is carried out by applying to the casing (13) a force (F) which is directed toward the valve head (11) and which brings the central portion (201) of the blocking means into contact with the chamfer (50) of the fixing rod and at least one of the notches (30) of the fixing rod (12) in order to block the casing (13) in position on the valve (11).

11. A wheel module for a tire pressure monitoring system, the module comprising:
a snap-in inflation valve (11);
an electronic casing (13) which is fixed to the valve in a removable manner for a valve replacement operation, wherein the valve is comprised of a resiliently deformable material and comprises a valve body (110) through which a metal conduit extends for the introduction of inflation air, the valve body has a first end (112) which is provided with a thread (113) which is capable of receiving a closure cap (114) and a second end (115) to which there is fixed a hollow metal fixing rod (12) which is provided with notches (30),
wherein the electronic casing (13) is mounted in a sliding manner on the fixing rod (12) and comprises a means for blocking the position of the casing relative to the valve in a reversible manner; and
a substantially U-shaped metal wire (20), a first end (202) and a second end (203) of which are inserted below retention lugs (204, 206) which are produced on a face (15) of the casing, the metal wire (20) being capable of being inserted into the notches (30) of the fixing rod (12) in order to apply to the casing a stress force (C) which is capable of fixing the casing in position relative to the valve,
wherein the blocking in position of the blocking means is carried out by applying to the casing (13) a force (F) which is directed toward the valve head (11) and which brings the central portion (201) of the blocking means into contact with a chamfer (50) of the fixing rod and at least one of the notches (30) of the fixing rod (12) in order to block the casing (13) in position on the valve (11).

* * * * *